United States Patent
Azmat

(10) Patent No.: US 12,124,541 B2
(45) Date of Patent: Oct. 22, 2024

(54) INCORPORATING LICENSE MANAGEMENT DATA INTO A VIRTUAL MACHINE

(71) Applicant: Flexera Software LLC, Itasca, IL (US)

(72) Inventor: Haroon Azmat, Maidenhead (GB)

(73) Assignee: Flexera Software LLC, Itasca, IL (US)

(*) Notice: Subject to any disclaimer, the term of this patent is extended or adjusted under 35 U.S.C. 154(b) by 99 days.

(21) Appl. No.: 15/334,238

(22) Filed: Oct. 25, 2016

(65) Prior Publication Data
US 2018/0113999 A1 Apr. 26, 2018

(51) Int. Cl.
*G06F 21/10* (2013.01)
*G06F 9/455* (2018.01)
*G06F 21/53* (2013.01)

(52) U.S. Cl.
CPC ........ *G06F 21/105* (2013.01); *G06F 9/45533* (2013.01); *G06F 21/53* (2013.01); *G06F 2009/45587* (2013.01); *G06F 21/1078* (2023.08)

(58) Field of Classification Search
CPC ... G06F 21/105; G06F 9/4553; G06F 21/1078
USPC .......................................................... 705/59
See application file for complete search history.

(56) References Cited

U.S. PATENT DOCUMENTS

| | | | |
|---|---|---|---|
| 8,027,921 B1* | 9/2011 | Boydstun | G07F 7/1025 705/52 |
| 9,104,876 B1* | 8/2015 | Summers | G06F 16/188 |
| 2002/0087719 A1* | 7/2002 | Katoh | H04L 51/56 709/229 |
| 2010/0205303 A1* | 8/2010 | Chaturvedi | G06F 21/126 709/226 |
| 2010/0223364 A1* | 9/2010 | Wei | H04L 67/1097 718/1 |

* cited by examiner

*Primary Examiner* — John W Hayes
*Assistant Examiner* — Cristina Owen Sherr
(74) *Attorney, Agent, or Firm* — Knobbe, Martens, Olson & Bear, LLP

(57) ABSTRACT

Certain aspects of the technology disclosed involve providing a virtual machine instance with license management data to identify and differentiate various virtual machine instances. A virtual appliance may generate license management data in response to a triggering event of a virtual machine. The triggering event may include any of a migration, clone, snapshot, or request via a representational state transfer endpoint. The virtual machine may provide the license management data to a license server and a licensed application configured to run on the virtual machine. The license management data may be used in resource management systems, such as a license management system, to defeat licensing exploits in a cloud computing environment.

12 Claims, 7 Drawing Sheets

INCORPORATING LICENSE MANAGEMENT DATA INTO A VIRTUAL MACHINE

TECHNICAL FIELD

The present application is related to inventory tracking systems, and more specifically to methods and systems to incorporating license management data into an instance of a virtual machine.

BACKGROUND

Software licensors may grant a software license to a machine to run software pursuant to the license. Conventionally, the machine is a physical computer having a Media Access Control address (referred to as a "MAC-address" or "hostID") tied to an Ethernet Network Interface Card (NIC) of the physical computer. However, virtual machines may not be tied to a particular physical computer having a particular hostID.

A virtual machine is an emulation of a computer system that imitates dedicated hardware. The end user of the a virtual machine may have the same user experience on the virtual machine as he or she would have on a dedicated hardware machine. Because virtual machines are software emulations of dedicated hardware machines, multiple clones (copies) of a virtual machine may be made from a single virtual machine. Since it is difficult to track and differentiate between the clones of the virtual machine, an exploiter may run multiple copies of a software application on the clones despite a software license restricting usage of the software application to a single machine.

Avoiding exploitation of software licenses may reduce profit loss for a software licensor. However, software vendors struggle to implement licensing management technology that takes virtual machine technology into account. It is a challenge to identify and differentiate copies of virtual machine instances for inventory tracking purposes.

SUMMARY

Certain aspects of the technology disclosed herein involve generating license management data in response to a triggering event. A virtual appliance, operating as a service in a cloud computing platform, may generate license management data in response to a triggering event. License management data may include, for example, a unique identifier for an instance of a virtual machine, a unique identifier associated with a user, an irreversible time stamp, a secure shell (SSH) key, a virtual file anchor, or any combination thereof. A triggering event may include, for example, the virtual machine being executed via a snapshot, import, or clone operation, or a request via a representational state transfer endpoint.

Embodiments include injecting license management data into an instance of a virtual machine. The virtual appliance may inject license management data into secure storage in an instance of a virtual machine. License management data in secure storage in an instance of a virtual machine may be used for inventory tracking purposes. Embodiments include cross-referencing license management data stored in an instance of a virtual machine with license management data stored in an instance of a licensing server. Embodiments include determining if a software application is licensed for use on the instance of the virtual machine.

Some embodiments of this disclosure have other aspects, elements, features, and steps in addition to or in place of what is described above. These potential additions and replacements are described throughout the rest of the specification.

Figure 1:
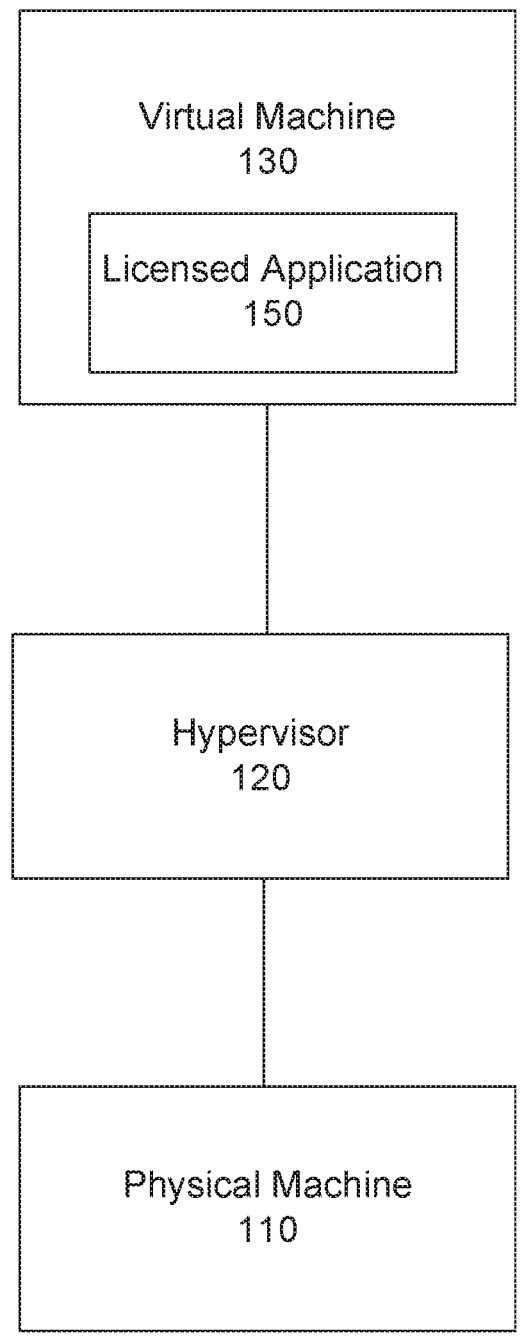
FIG. 1 is a block diagram illustrating an instance of a virtual machine having metadata stored on a metadata server, according to various embodiments.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

Certain aspects of the technology disclosed involve providing a virtual machine instance with license management data to identify and differentiate copies of virtual machine instances. Conventional virtual machines may be manipulated so that distinguishing between virtual machines may be difficult. There are various operations available for manipulating instances of virtual machines including migration, clone, and snapshot operations.

During a migration operation, the hypervisor moves a virtual machine from a physical machine managed by a hypervisor to another physical machine managed by another hypervisor. Migration may be either live or cold. A live migration refers to a process of moving a running virtual machine between physical machines without disconnecting the client(s). A cold migration process disconnects the clients, stops or halts the virtual machine, and then moves the virtual machine to a new physical machine. During a migration operation, no new instance of the virtual machine is created. The same instance of the virtual machine is moved to a new physical machine. After the migration operation, the virtual environment of the original physical machine no longer include that instance of the virtual machine.

During a clone operation, a hypervisor of the virtual environment creates a new virtual machine instance of an existing virtual machine. During a snapshot operation, the hypervisor creates a time-based copy of a virtual machine instance. When the hypervisor conducts a clone or snapshot operation, the hypervisor creates a new instance of the existing virtual machine. In other words, a separate virtual machine instance is created in the virtual environment managed by the hypervisor.

A cloned virtual machine instance is a new virtual machine that is a copy of the original virtual machine. The cloned virtual machine and the original virtual machine may both continue to run and evolve into states that are different from each other. A snapshot is a point-in-time backup for a state of the original virtual machine. The snapshot allows reverting the virtual machine to a previous state at a particular point in time.

A clone exploit is a license exploit of illegitimately obtaining more licenses by using a hypervisor to create clones of an original virtual machine. In one example, there is a license permitting usage of a software on one and only one machine (either a virtual machine or a physical machine); and there is already a virtual machine running the software legitimately under the license. The hypervisor then creates clones of the original virtual machines. If there is no mechanism to uniquely identifying the original virtual machine and its clones, a license management system will not be able to differentiate between the original virtual machine and the clones. As a result, the clones of the original virtual machine will be able to run the software without rejection from the license management system, even if the license permits only one machine to use the software. An exploiter may run multiple copies of a licensed software application on one or more manipulated virtual machines despite a software license restricting usage of the software application to a single machine. Embodiments of the present invention may prevent an exploiter from running copies of a licensed software application on a manipulated virtual machine in violation of a software license.

Embodiments include a virtual appliance generating license management data in response to a triggering event. The virtual appliance may be operating as a service in a cloud computing platform. License management data may include, for example, a unique identifier associated with an instance of a virtual machine (e.g., a FLX_ID), a unique identifier associated with a user, an irreversible time stamp, a secure shell (SSH) key, a virtual file anchor, or any combination thereof. A triggering event may include, for example, any of a migration, clone, snapshot, or request via representational state transfer endpoint. The virtual appliance may store the license management data via a storage application program interface (API) of the virtual appliance.

Embodiments include injecting license management data into a licensed application and into a license server. In an embodiment, the virtual appliance may inject license management data into secure storage in an instance of a virtual machine before or while the instance is being launched (i.e. before or at boot time). License management data in secure storage in an instance of a virtual machine may be used for inventory tracking purposes. Embodiments include cross-referencing license management data stored in an instance of a virtual machine with license management data stored in an instance of a licensing server. Embodiments include determining if a licensed application is licensed for use on the instance of the virtual machine.

FIG. 1 illustrates an instance of a virtual machine 130 managed by a hypervisor 120, according to various embodiments. In an embodiment, the virtual machine 130 may be hosted by a compute node and be part of a cloud computing environment, as discussed below with reference to FIG. 2. The hypervisor 120 (also referred to as "virtual machine manager") may manage one or more virtual machines including, for example, the virtual machine 130 (also referred to as "guest machine"). The hypervisor 120 may be software, firmware, hardware, or a combination thereof that creates and runs virtual machines. The hypervisor 120 may run on a physical machine 110 (also referred to as "host machine") or on a conventional operating system. In an embodiment, the virtual machine 130 may include a guest operating system with a virtual operating platform. Multiple instances of guest operating systems may share the virtualized hardware resources supported by the physical machine 110.

The hypervisor 120 may be, for example, a bare-metal hypervisor (also referred to as "type-1 hypervisor" or "native hypervisor"), a hosted hypervisor (also referred to as "hype-2 hypervisor"), or a hybrid-type hypervisor. A bare-metal hypervisor may run directly on the physical machine 110 (hence the name "bare-metal"). The guest operating systems of the virtual machines 130 may run as processes on the physical machine 110 via the hypervisor 120. Examples of bare-metal hypervisors include Microsoft Hyper-V, Citrix XenServer, VMware ESX/ESXi, Oracle VM Server, etc. A hosted hypervisor may run on a conventional operating system (not shown) running on the physical machine 110. The hypervisor 120 may run on the convention operating system as a computer program. A guest operating system of the virtual machine 130 may run on top of the conventional operating system via the hypervisor 120. Examples of hosted hypervisor include VMware workstation and VirtualBox. There are also hybrid types of hypervisor. For example, Linux's Kernel-based Virtual Machine (KVM) and FreeBSD's bhyve are kernel modules that effectively convert the host operating systems to type-1 bare-metal hypervisors. Nevertheless, the Linux and FreeBSD operating systems are still conventional general-purpose operating systems. The KVM and bhyve hypervisors compete with other applications for virtual machine resources, which may be also categorized as type-2 hosted hypervisors.

Figure 2:
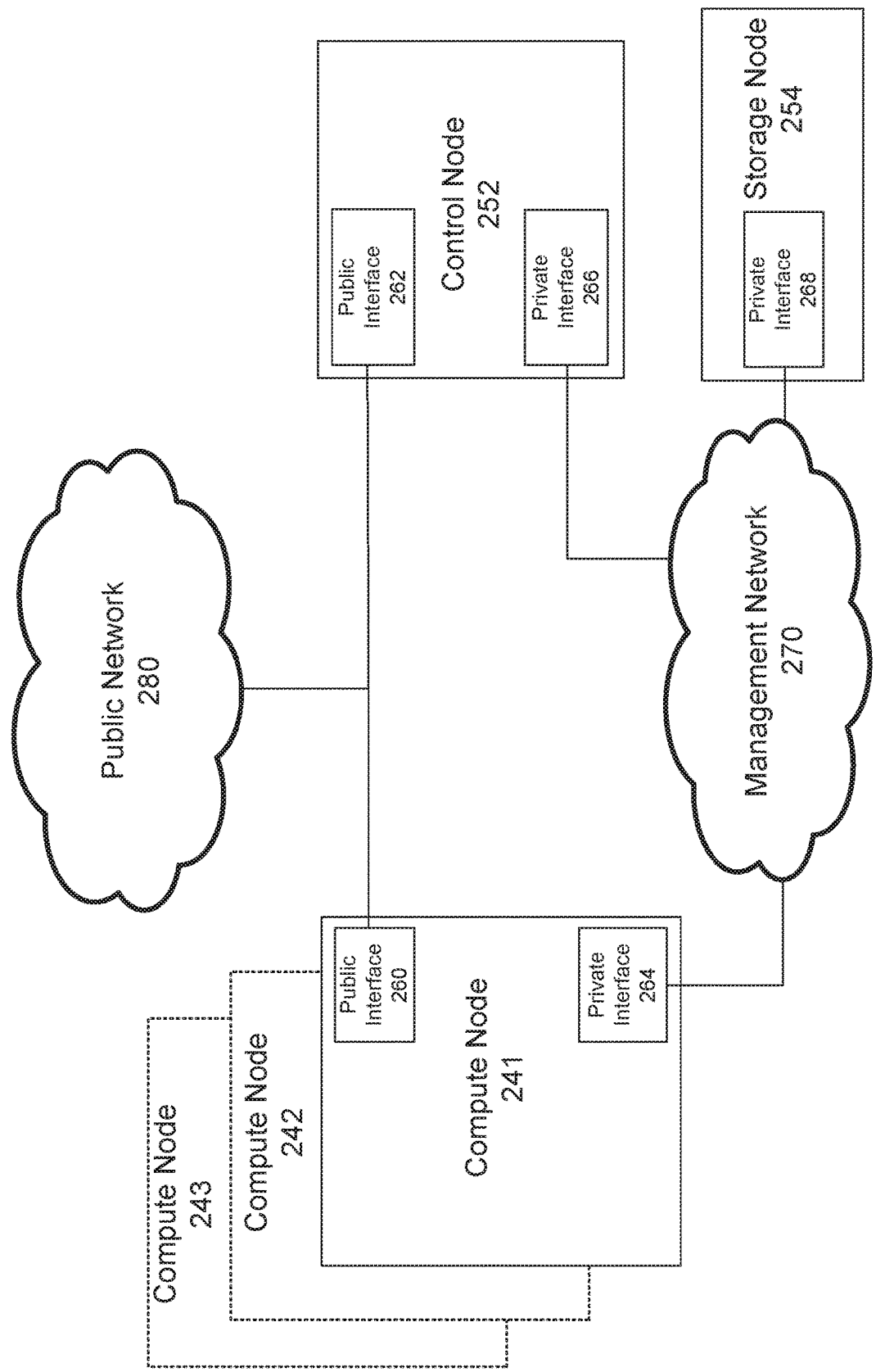
FIG. 2 is a block diagram illustrating a cloud computing environment, according to various embodiments.

FIG. 2 is a block diagram illustrating a cloud computing environment, according to various embodiments. The cloud computing environment may be, for example, a hybrid cloud, private cloud, public cloud, community cloud, distributed cloud, intercloud, or multicloud. The cloud computing environment may include a combination of elements of two or more clouds (e.g., private cloud and public cloud) that are bound together as a distinct entity. The cloud computing environment may offer the benefit of multiple deployment models by crossing isolation and provider boundaries. The cloud computing environment may be aggregated and/or integrated with another cloud computing environment.

The cloud computing environment may include one or more compute nodes (e.g., compute node 241, compute node 242, compute node 243, etc.) capable of hosting virtual machine instances (e.g., virtual machine 130), a control node 252, and a storage node 254. Compute node 241, control node 252, and storage node 254 may be configured to transmit and/or receive data via one or more communication interfaces (e.g., public interface 260, public interface 262, private interface 264, private interface 266, and private interface 268). The one or more communication interfaces may be endpoint application programming interfaces (endpoint APIs). Compute node 241, control node 252, and storage node 254 may be connected to management network 270 and/or public network 280.

The one or more compute nodes may select a physical machine (e.g., physical machine 110) or an operating system to create and launch virtual machine instances. Creating a virtual machine instance may involve, for example, selecting a name, provisioning resources, and selecting one or more other options indicating how the virtual machine instance will run. In contrast, launching a virtual machine instance may involve booting up the virtual machine. The one or more compute nodes may follow instructions received by a control node 252. The control node may transmit instructions to compute nodes via public interface (e.g., from public interface 262 to public interface 260) and/or a private interface (e.g., from private interface 266 to private interface 264). Transmitting instructions from private interface 266 of control node 252 to private interface 264 of compute node 241 may reduce a risk of releasing sensitive information.

The control node 252 may be a web-based graphical interface to create and manage resources in the cloud computing environment. In an embodiment, the control node 252 may manage virtual machine instances on the one or more compute nodes. In another embodiment, another node may manage virtual machine instances on the one or more compute nodes. The storage node 254 may receive, store, and transmit data to resources in the cloud computing environment. The storage node 254 may receive and/or transmit data via private interface 268. The storage node 254 may store data in persistent storage, volatile storage, or a combination thereof.

Management network 270 may receive and/or transmit data to one or more interfaces, such as, for example, private interface 264, private interface 266, and private interface 268. Communications via management network 270 may be isolated from the public network 280. Isolating data transmitted via management network 270 may enhance security for sensitive communications.

Figure 3:
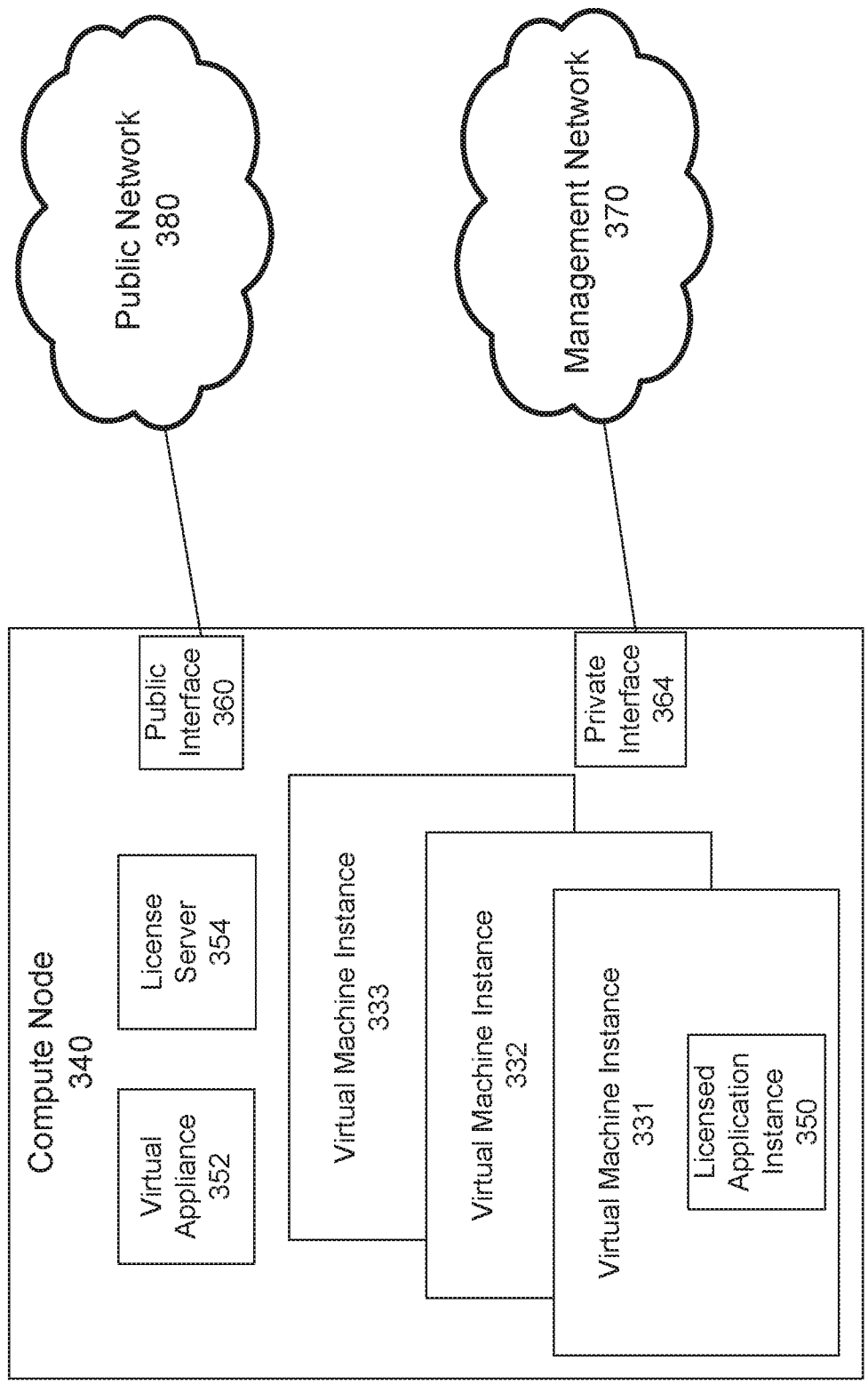
FIG. 3 is a block diagram illustrating a compute node having a virtual appliance, according to various embodiments.

FIG. 3 is a block diagram illustrating a compute node 340 having a virtual appliance 352, license server 354, and one or more virtual machine instances, according to various embodiments. Compute node 340 may be part of the cloud computing environment described above with reference to FIG. 2. Compute node 340 may host one or more guest instances, such as, for example, virtual appliance 352, license server 354, and one or more virtual machine instances (e.g., virtual machine instance 331, virtual machine instance 332, virtual machine instance 333, etc.). Compute node 340 may communicate with public network 380 via public interface 360 and management network 370 via private interface 364.

Virtual appliance 352 may be running as a guest instance on the compute node 340. Virtual appliance 352 may not need any support from or attachment to any physical component of a physical machine, and may not emulate any physical component of an underlying physical machine. Virtual appliance 352 may generate license management data for incorporation into one or more virtual machine instances in a cloud computing environment (e.g., a hybrid cloud environment). License management data may include, for example, a unique identifier associated with an instance of a virtual machine (e.g., a FLX_ID), a unique identifier associated with a user, an irreversible time stamp, a secure shell (SSH) key, a virtual file anchor, or any combination thereof. In an embodiment, virtual appliance 352 generates license management data for a virtual machine instance (e.g., virtual machine instance 331) in response to a triggering event. The triggering event may include, for example, creating the virtual machine instance 331 through a migration, cloning, or snapshot process. For example, a cloning process of virtual machine instance 332 may result in virtual machine instance 331. In another example, a snapshot process of virtual machine instance 332 may result in virtual machine instance 331. In another example, virtual machine instance 332 may be migrated resulting in virtual machine instance 331.

In an embodiment, virtual appliance 352 may provide and/or insert the license management data into the virtual machine instance (e.g., virtual machine instance 331). License management data may be inserted into the virtual machine instance (e.g., into a licensed application configured to run on the virtual machine instance) prior to launch, during launch, or after launch of the virtual machine instance. In a preferred embodiment, license management data may be inserted into the virtual machine instance prior to launch of the virtual machine instance. In an example, virtual appliance 352 may insert the license management data into a licensed application 350 running on (or configured to run on) the virtual machine instance 331 prior to launch of the virtual machine instance 331 (e.g., after creating virtual machine instance 331 but prior to first booting virtual machine instance 331). Virtual appliance 352 may insert license management data into the virtual machine instance by exposing representational state transfer (REST) endpoints. The licensed application 350 in the virtual machine may extract license management data using an endpoint application programming interface (endpoint API).

Virtual appliance 352 may provide license server 354 with license management data generated in response to the triggering event. Virtual appliance 352 may provide license management data to license server 354 prior to, during, or after launch of a virtual machine instance. In a preferred embodiment, virtual appliance 352 may provide license management data to license server 354 prior to launch of the virtual machine instance. Virtual appliance 352 may provide license management data to license server 354 by exposing REST endpoints. License server 354 may extract license management data using endpoint APIs.

Figure 4:
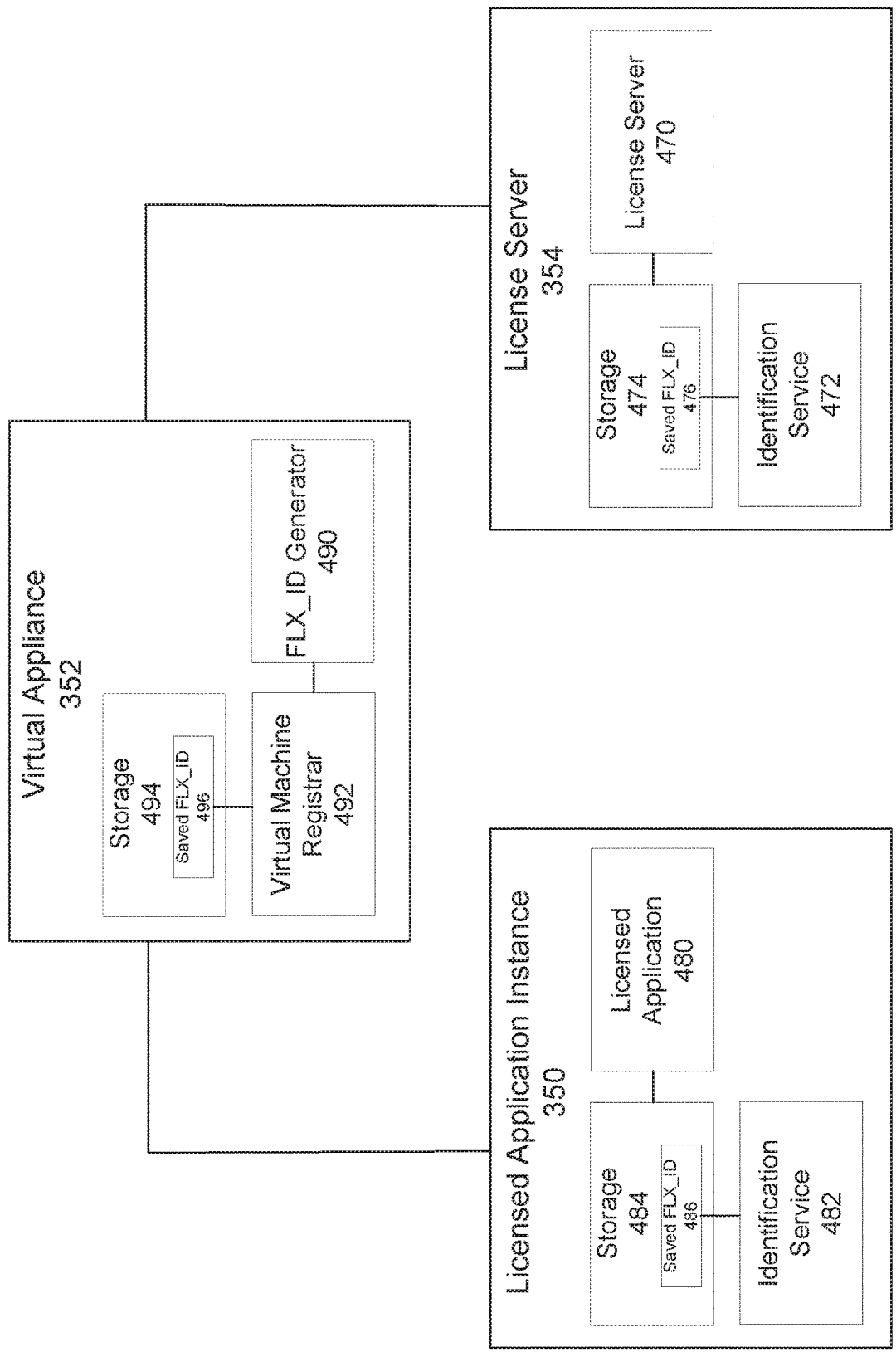
FIG. 4 is a block diagram illustrating a virtual environment for preventing license exploitation by providing license management data to a licensed application and a license server, according to various embodiments.

FIG. 4 is a block diagram illustrating a virtual environment for preventing license exploitation by providing license management data to a licensed application 350 and a license server 354, according to various embodiments.

In an embodiment, the virtual appliance 352 may be running as a guest instance on a compute node (e.g., compute node 340). In another embodiment, the virtual appliance 352 may be running on a virtual machine (e.g., virtual machine instance 331). The virtual appliance 352 can include a license management data generator, such as, for example, FLX_ID generator 490, a user ID generator, an irreversible time stamp generator, an SSH key generator, a virtual file anchor generator, or any combination thereof. An example of the virtual appliance 352 including a FLX_ID generator is discussed below. However, embodiments including any license management data generator or combination of license management data generators to generate any license management data are contemplated. Discussion of operation of the elements in FIG. 4 with reference to the FLX_ID and/or FLX_ID generator is by way of example and not intended to limit the scope of this disclosure to any particular license management data or license management data generator.

The virtual appliance 352 may include FLX_ID generator 490, virtual machine registrar 492, and storage 494. Storage 494 may be virtual persistence storage. Storage 494 may include a saved FLX_ID 496 that uniquely identifies a virtual machine (e.g., virtual machine instance 331) and may globally differentiate the virtual machine from other virtual machine instances (e.g., virtual machine instance 332, virtual machine instance 333, etc.).

In some embodiments, the FLX_ID may be a Globally Unique Identifier (GUID) or Universally Unique Identifier (UUID), which may be a 128-bit value that may or may not be generated from random or pseudo-random numbers. The GUID or UUID mechanism may enable generating unique identifiers without any central authority. The total number of such unique GUIDs may be as much as $2^{122}$. The number of unique GUIDs may be so large that the probability of the same number being generated randomly twice is negligible.

In an embodiment, licensed application 350 may be running as a guest instance on a compute node (e.g., compute node 340). License server 354 may include a licensed application 480, identification service 482, and storage 484. Storage 484 may be virtual persistence storage. Storage 484 may include a saved FLX_ID 486. Saved FLX_ID 486 may be received from the virtual appliance 352 and generated by FLX_ID generator 490. Saved FLX_ID 486 may or may not be the same as saved FLX_ID 496.

In an embodiment, license server 354 may be running as a guest instance on a compute node (e.g., compute node 340). License server 354 may include license server 470, identification service 472, and storage 474. Storage 474 may be virtual persistence storage. Storage 474 may include a saved FLX_ID 476. Saved FLX_ID 476 may have been received from the virtual appliance 352 and generated by FLX_ID generator 490. Saved FLX_ID 476 may or may not be the same as saved FLX_ID 496.

In an embodiment, storage 474, storage 484, and/or storage 494 may be trusted storage (e.g., physical and/or virtual trusted storage). Physical trusted storage may be hardware and firmware of disk enclosures having an architecture that enables enforcement of storage policies. Virtual trusted storage may be a tamper resistant repository that enables enforcement of storage policies. For example, virtual trusted storage may be achieved by including a virtual file anchor in a file where the virtual file anchor cannot be modified by the file unless its name is decorated with a string known only to a trusted application and to the file system upon which the virtual file anchor resides. The specific decoration required to modify a file anchor may be generated by an algorithm known only to trusted applications. An attempt to tamper with a virtual file anchor without knowledge of the algorithm fails because the specific decoration is unknown. For example, the decoration may be unknown because the decoration is file-specific, single-use, and/or time limited. Attempts to modify the virtual file anchor without the algorithm may result in modification of a pseudo-file.

The virtual appliance 352 may include a trusted decoration generator that may provide specific decoration required to modify a file anchor in storage 474, storage 484, and/or storage 494. For example, saved FLX_ID 476, saved FLX_ID 486, and saved FLX_ID 496 may be a file anchor in their respective files such that specific decoration is required to modify them. The virtual appliance 352 may be able to modify saved FLX_ID 476, saved FLX_ID 486, and saved FLX_ID 496 by generating the specific decoration needed for modification. However, attempts to modify saved FLX_ID 476, saved FLX_ID 486, and saved FLX_ID 496 without the specific decoration required may merely result in modification of a pseudo-file (e.g., a mock FLX_ID).

Figure 5:
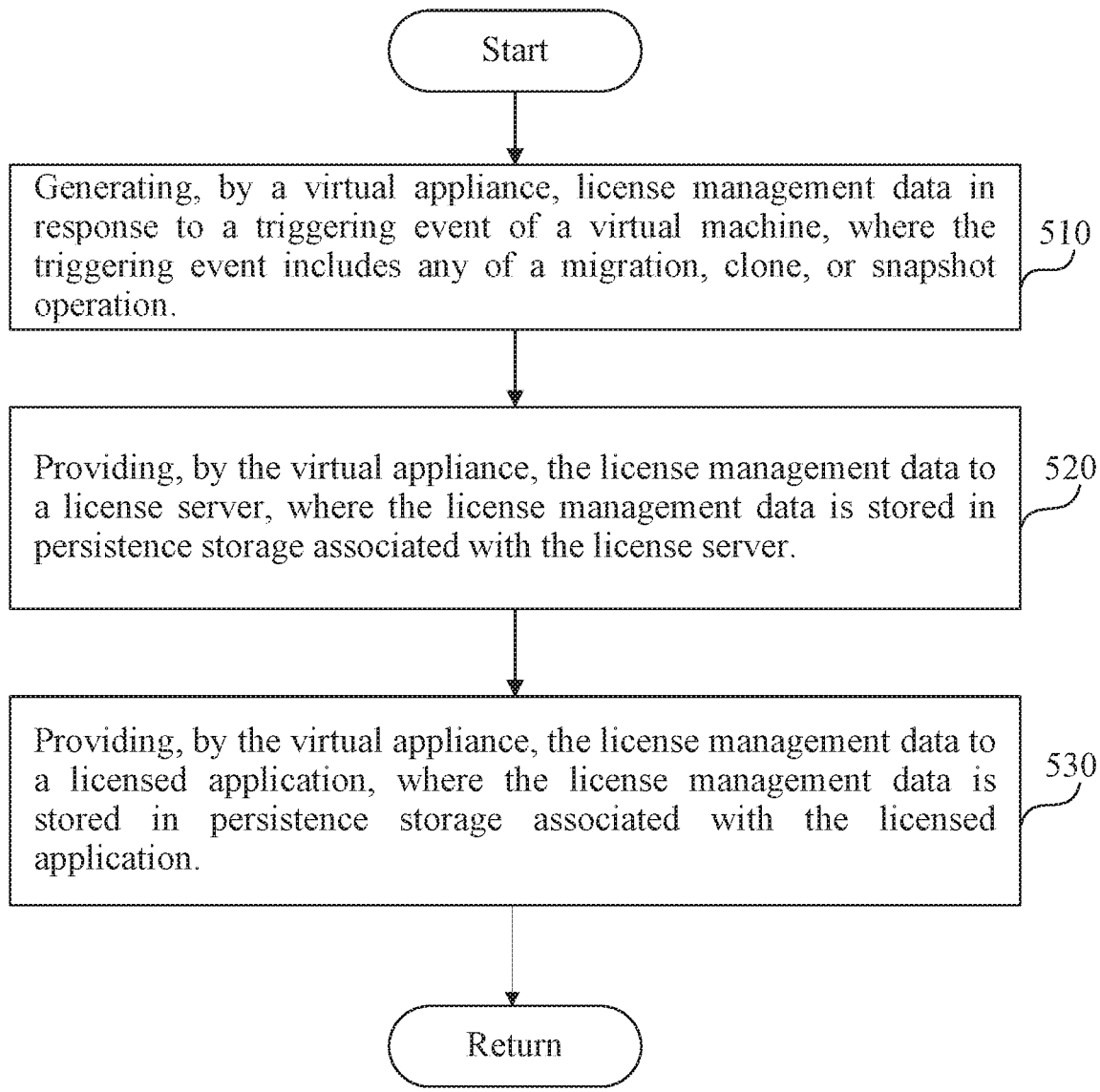
FIG. 5 is a flow diagram illustrating a sample process of preventing software licensing exploitation in a virtual environment, according to various embodiments.

FIG. 5 is a flow diagram illustrating an example of a method for preventing software licensing exploitation in a virtual environment, according to various embodiments.

In step 510, a virtual appliance may generate license management data in response to a triggering event of a virtual machine. License management data may include, for example, a unique identifier associated with an instance of a virtual machine (e.g., a FLX_ID), a unique identifier associated with a user, an irreversible time stamp, a secure shell (SSH) key, a virtual file anchor, or any combination thereof. Combinations of license management data include, for example, a unique identifier that is also a virtual file anchor, a virtual file anchor having specific decoration that changes based on an irreversible time stamp, a unique identifier that changes based on an irreversible time stamp, and various other groupings/amalgamations.

The triggering event may include any of a migration, clone, or snapshot operation of a virtual machine. The triggering event may involve a first virtual machine instance creating and/or transforming into a second virtual machine instance. The virtual appliance may receive notification of the triggering event from, for example, a control node receiving inputs from a user to perform any of a migration, clone, or snapshot operation.

In step 520, the virtual appliance may provide the license management data to a license server. The license management data may be provided by the virtual appliance exposing REST endpoints and the license server extracting the license management data using endpoint APIs. The license management data may be stored in storage associated with the license server. The storage may be persistent storage that can retain the license management data in the event of electrical power loss. The storage may be trusted storage to prevent a user from tampering with the license management data.

In step 530, the virtual appliance may provide the license management data to a licensed application. Providing may include, for example, inserting the license management data into storage associated with the licensed application or placing the license management data in a location retrievable by the licensed application (e.g., the license application can retrieve data using endpoint APIs). The license management data may be stored in storage associated with the licensed application. The storage may be persistent storage that can retain the license management data in the event of electrical power loss. The storage may be trusted storage to prevent a user from tampering with the license management data.

Figure 6:
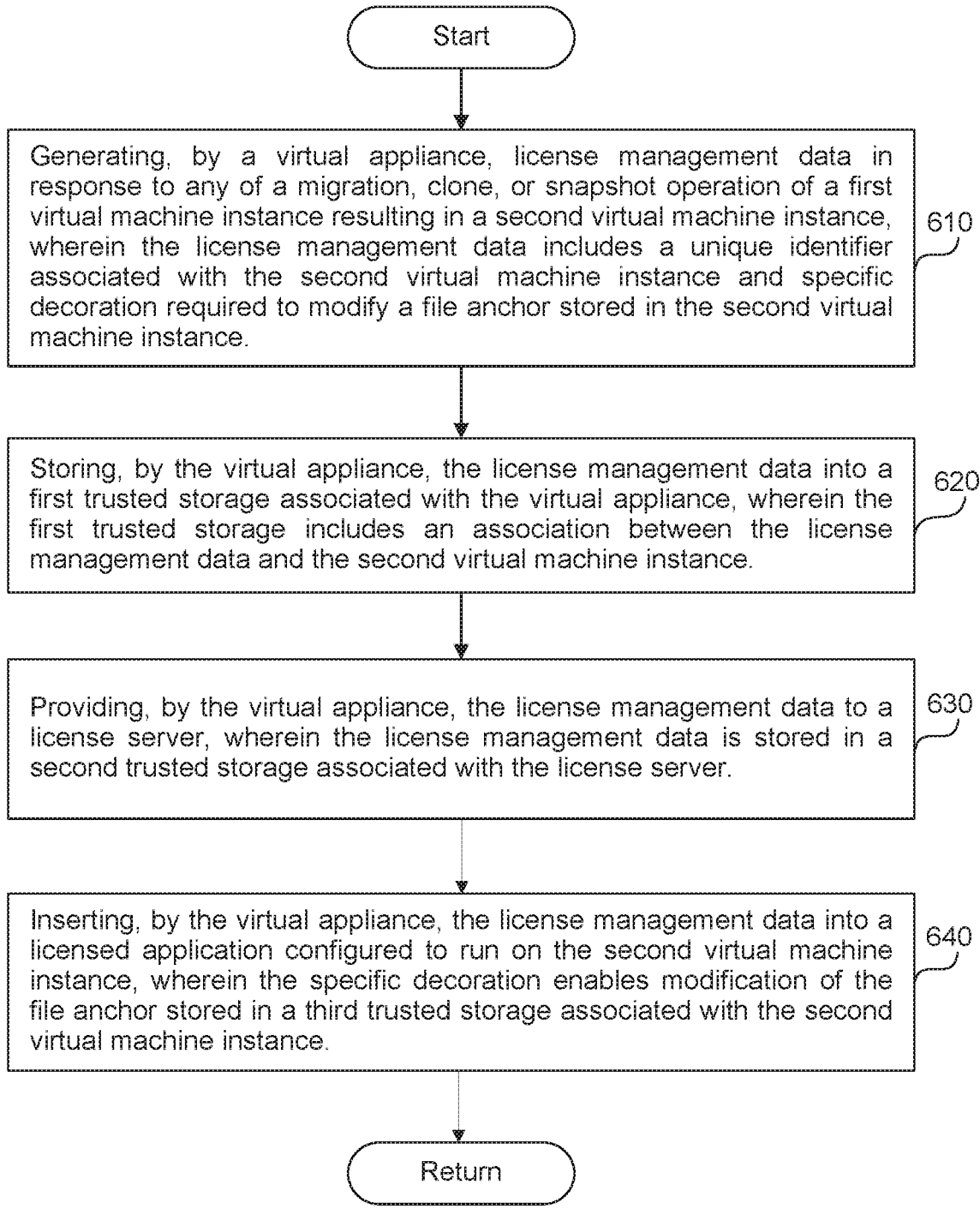
FIG. 6 a flow diagram illustrating another sample process of preventing software licensing exploitation in a virtual environment, according to various embodiments.

FIG. 6 a flow diagram illustrating another example of a method for preventing software licensing exploitation in a virtual environment, according to various embodiments.

In step 610, the virtual appliance may generate license management data in response to a triggering event (e.g., any of a migration, clone, or snapshot operation of a first virtual machine instance that results in a second virtual machine instance, or a request via representational state transfer endpoint). License management data may include, for example, a unique identifier associated with an instance of a virtual machine (e.g., a FLX_ID), a unique identifier associated with a user, an irreversible time stamp, a secure shell (SSH) key, a virtual file anchor, or any combination thereof. For example, the license management data may include a unique identifier associated with the second virtual machine instance (e.g., a FLX_ID) and specific decoration required to modify a file anchor stored in the second virtual machine instance. The unique identifier associated with the second virtual machine instance may itself be a file anchor (e.g., a second file anchor) that may replace a file anchor stored in the second virtual machine instance (e.g., a first file anchor). The first file anchor may be a remnant from a previous virtual machine instance (e.g., the first virtual machine instance) from the second virtual machine instance was created.

In an embodiment, the specific decoration required to modify the file anchor stored in the second virtual machine instance may change based on a time stamp included in the license management data. The time stamp may be irreversible so that a former specific decoration cannot be reused by altering the time stamp.

In step 620, the virtual appliance may store the license management data into a first trusted storage associated with the virtual appliance. The first trusted storage may include an association between the license management data and the second virtual machine instance. The first trusted storage may require specific decoration to modify a file anchor in the first trusted storage. The specific decoration required to modify the file anchor in the first trusted storage of the virtual appliance may or may not be the same as the specific decoration required to modify the file anchor stored in the second virtual machine instance.

In step 630, the virtual appliance may provide the license management data to a license server. The license management data may be stored in a second trusted storage associated with the license server. The second trusted storage may include an association between the license management data and the second virtual machine instance. The second trusted storage may require specific decoration to modify a file anchor in the second trusted storage. The specific decoration required to modify the file anchor in the second trusted storage of the license server may or may not be the same as the specific decoration required to modify the file anchor stored in the second virtual machine instance.

In step 640, the virtual appliance may insert the license management data into a licensed application configured to run on the second virtual machine instance. The specific decoration may enable modification of the file anchor stored in a third trusted storage associated with the second virtual machine instance. Attempts to modify the file anchor stored in the third trusted storage without the specific decoration required may merely result in modification of a pseudo-file (i.e. a mock file that is not the file anchor).

In an embodiment, the specific decoration needed to modify the file anchor stored in the second virtual machine instance may change based on a first time stamp. The first time stamp may be included in the license management data inserted into the licensed application in the second virtual machine instance. The time stamp may be irreversible so that a former specific decoration cannot be reused by altering the time stamp. The virtual appliance may generate a second time stamp (e.g., representing a later time) that may be irreversible. Subsequent to modifying the file anchor stored in the third trusted storage, the virtual appliance may insert the second time stamp into the third trusted storage. Inserting the second time stamp into the third trusted storage may change the specific decoration needed to modify the file anchor stored in the third trusted storage. Thus, the specific decoration used to modify the file anchor in the third trusted storage may no longer enable modification of the file anchor in the third trusted storage. By causing the specific decoration used to modify the file anchor to no longer enable modification of the file anchor, this method eliminates a possibility of a user intercepting the specific decoration to determine how to modify the file anchor since the specific decoration used is no longer operable after altering the time stamp and the time stamp may be irreversible so a user cannot revert the time stamp to utilize the inserted specific decoration.

In an embodiment, the virtual appliance may provide authorization to launch the second virtual machine instance after providing (or inserting) license management data into the licensed application. The virtual appliance may transmit (e.g., to a control node managing the compute node) data indicating authorization to launch the second virtual machine instance subsequent to providing the license management data to the licensed application. The control node may receive the data indicating authorization to launch the second virtual machine instance from the virtual appliance, and in response to receiving the data indicating authorization to launch the second virtual machine instance, the control node can transmit a notification to the compute node to launch the second virtual machine instance. The compute node can receive the notification to launch the virtual machine instance (e.g., from the control node), and may launch the second virtual machine instance hosted by the compute node.

In an embodiment, the licensed application may communicate with a license management system to determine whether a license authorizes operation of the licensed application on a virtual machine instance (e.g., the second virtual machine instance) based on the license management data provided to the licensed application. The licensed application may transmit a license verification request (e.g., including a query and the license management data), for example, in response to a user attempting to run the licensed application on the virtual machine instance (e.g., the second virtual machine instance). The license management system may use the license management data from one or more virtual machine instances to identify and distinguish various virtual machines (e.g., the second virtual machine instance). The licensed application may receive an notification indicating whether or not the licensed application is authorized to operate on the virtual machine instance (e.g., the second virtual machine instance).

Computer

Figure 7:
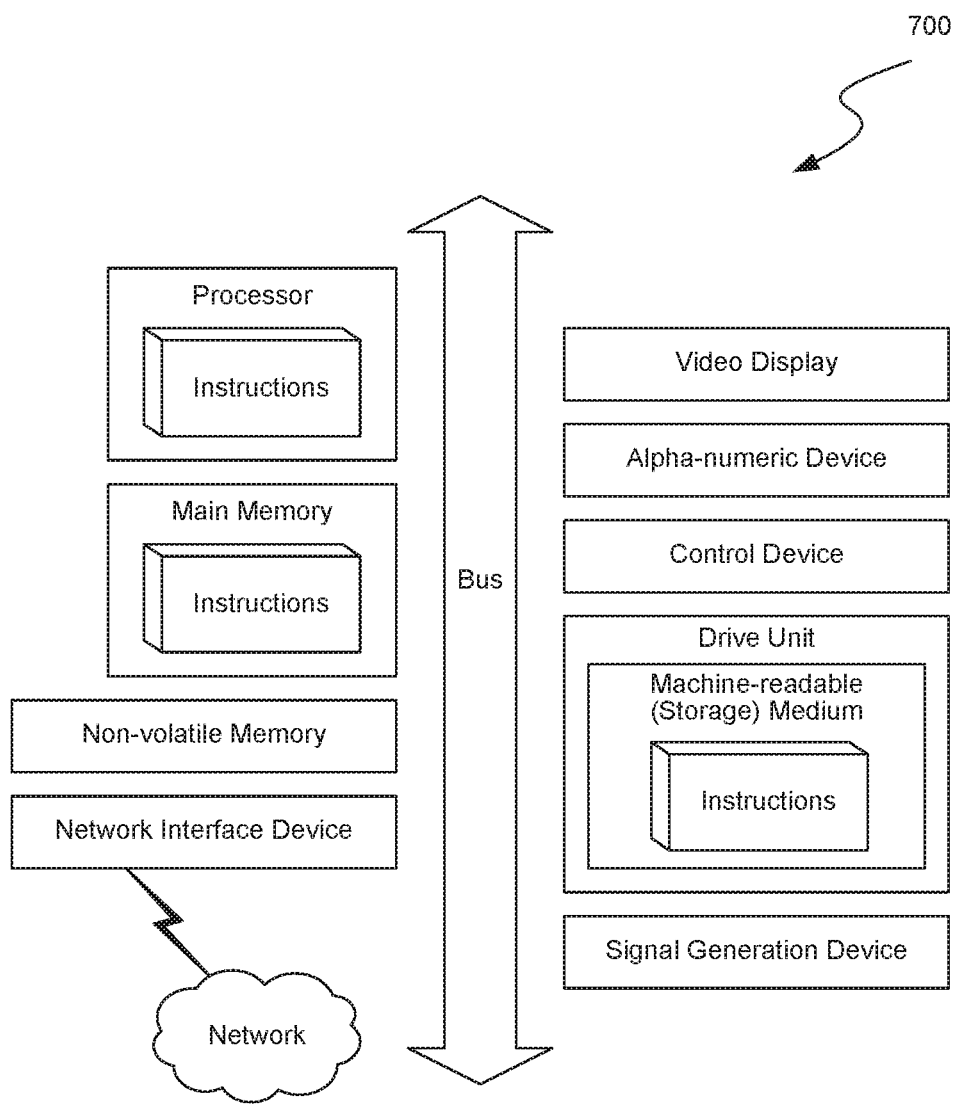
FIG. 7 is a diagrammatic representation of a machine in the example form of a computer system within which a set of instructions, for causing the machine to perform any one or more of the methodologies or modules discussed herein, may be executed.

FIG. 7 is a diagrammatic representation of a machine in the example form of a computer system 700 within which a set of instructions, for causing the machine to perform any one or more of the methodologies or modules discussed herein, may be executed.

In the example of FIG. 7, the computer system 700 includes a processor, memory, non-volatile memory, and an interface device. Various common components (e.g., cache memory) are omitted for illustrative simplicity. The computer system 700 is intended to illustrate a hardware device on which any of the components described in the example of FIGS. 1-19 (and any other components described in this specification) may be implemented. The computer system 700 may be of any applicable known or convenient type. The components of the computer system 700 may be coupled together via a bus or through some other known or convenient device.

This disclosure contemplates the computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

The processor may be, for example, a conventional microprocessor such as an Intel Pentium microprocessor or Motorola PowerPC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory may include, by way of example but not limitation, random access memory (RAM), such as dynamic RAM (DRAM) and static RAM (SRAM). The memory may be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 700. The non-volatile storage may be local, remote, or distributed. The non-volatile memory is optional because systems may be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface may include one or more of a modem or network interface. It will be appreciated that a modem or network interface may be considered to be part of the computer system 700. The interface may include an analog modem, ISDN modem, cable modem, token ring interface, satellite transmission interface (e.g., "direct PC"), or other interfaces for coupling a computer system to other computer systems. The interface may include one or more input and/or output devices. The I/O devices may include, by way of example but not limitation, a keyboard, a mouse or other pointing device, disk drives, printers, a smayner, and other input and/or output devices, including a display device. The display device may include, by way of example but not limitation, a cathode ray tube (CRT), liquid crystal display (LCD), or some other applicable known or convenient display device. For simplicity, it is assumed that controllers of any devices not depicted in the example of FIG. 7 reside in the interface.

In operation, the computer system 700 may be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments may be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method for incorporating license management data into a virtual machine instance, the method being implemented by a virtual appliance and a compute node, and the method comprising:

detecting, by the virtual appliance, a triggering event resulting in formation of the virtual machine instance from an originating virtual machine instance, wherein the virtual appliance is running as a first guest instance on the compute node without attachment to any physical component of a physical machine, and wherein the compute node hosts the originating virtual machine instance and the virtual machine instance;

in response to detecting the triggering event, generating, by the virtual appliance, license management data including a unique identifier associated with the virtual machine instance and a specific decoration, wherein the specific decoration is required to modify a file anchor which is configured to store the unique identifier;

storing, by the virtual appliance, the license management data into a first trusted storage associated with the virtual appliance, wherein the first trusted storage includes an association between the license management data and the virtual machine instance, and wherein the first trusted storage includes a first file anchor which is modified to store the unique identifier;

providing, by the virtual appliance, the license management data to a second trusted storage of a license server running as a second guest instance on the compute node, wherein the second trusted storage includes a second file anchor which is modified to store the unique identifier;

inserting, by the virtual appliance via an application programming interface, the license management data into the virtual machine instance, wherein the virtual machine instance stores a third file anchor which is modified by the virtual appliance to store the unique identifier, wherein the license management data is inserted prior to launching of the virtual machine instance, and wherein the virtual machine instance is configured to run a licensed application;

causing, by the virtual appliance, the virtual machine instance to change the specific decoration into a second specific decoration, wherein subsequent to the change, the second specific decoration is required to modify the file anchor stored in the virtual machine instance; and authorizing, by the virtual appliance, launching of the virtual machine instance by the compute node subsequent to the insertion of the license management data.

2. The method of claim 1, wherein the third file anchor stored in the virtual machine instance is modified to include the unique identifier based on the specific decoration.

3. The method of claim 1, wherein the specific decoration required to modify the third file anchor changes based on a time indicated by an irreversible time stamp stored in the virtual machine instance.

4. The method of claim 3, wherein causing the virtual machine to change the specific decoration comprises:
generating, by the virtual appliance, another irreversible time stamp, wherein the another irreversible time stamp indicates a later time than the irreversible time stamp;
providing, by the virtual appliance, the another irreversible time stamp to the virtual machine instance subsequent to inserting the license management data into the licensed application;
modifying, via the specific decoration based on the another irreversible time stamp, the unique identifier to change to the second specific decoration,
wherein the second specific decoration is not provided to the virtual machine instance.

5. A system for incorporating license management data into a virtual machine instance comprising:
a control node managing a compute node in a cloud computing environment, wherein the compute node is configured to host virtual machine instances; and a virtual appliance running on the compute node, wherein the virtual appliance is configured to:
detect a triggering event resulting in formation of the virtual machine instance from an originating virtual machine instance, wherein the virtual appliance is running as a first guest instance on the compute node without attachment to any physical component of a physical machine, and wherein the compute node hosts the originating virtual machine instance and the virtual machine instance;
in response to detecting the triggering event, generate license management data including a unique identifier associated with the virtual machine instance and a specific decoration, wherein the specific decoration is required to modify a file anchor which is configured to store the unique identifier;
store the license management data into a first trusted storage associated with the virtual appliance, wherein the first trusted storage includes an association between the license management data and the virtual machine instance, and wherein the first trusted storage includes a first file anchor which is modified to store the unique identifier;
provide the license management data to a second trusted storage of a license server running as a second guest instance on the compute node, wherein the second trusted storage includes a second file anchor which is modified to store the unique identifier; and
insert, via an application programming interface, the license management data into the virtual machine instance, wherein the virtual machine instance stores a third file anchor which is modified by the virtual appliance to store the unique identifier, wherein the license management data is inserted prior to launching of the virtual machine instance, and wherein the virtual machine instance is configured to run a licensed application;
cause the virtual machine instance to change the specific decoration into a second specific decoration, wherein subsequent to the change, the second specific decoration is required to modify the file anchor stored in the virtual machine instance; and
authorize launching of the virtual machine instance by the compute node subsequent to the insertion of the license management data.

6. The system of claim 5, wherein the virtual appliance is further configured to receive a notification of the triggering event from the control node prior to launch of the virtual machine instance.

7. The system of claim 5, wherein the virtual appliance is further configured to transmit the authorization to launch the virtual machine instance to the control node to cause a hypervisor to launch the virtual machine instance.

8. The method of claim 1, wherein the triggering event includes any of a migration, clone, or snapshot operation.

9. The method of claim 1, further comprising:
receiving, by the virtual appliance, a notification of the triggering event from a control node managing the compute node, the notification being received by the control node prior to launch of the virtual machine instance.

10. The method of claim 1, wherein authorizing launching of the virtual machine instance comprises:
transmitting, by the virtual appliance to a control node managing the compute node, the authorization to launch the virtual machine instance subsequent to providing the license management data to the licensed application.

11. The method of claim 1, wherein the specific decoration is based on a first time stamp, and wherein causing the virtual machine instance to change the specific decoration comprises:
   generating a second time stamp; and
   inserting the second time stamp into the virtual machine instance, thereby changing the specific decoration into the second specific decoration.

12. The method of claim 1, wherein causing the virtual machine instance to change the specific decoration into the second decoration eliminates user interception of the specific decoration to determine how to modify the file anchor.

* * * * *